United States Patent [19]

Kaneko et al.

[11] Patent Number: 4,947,286

[45] Date of Patent: Aug. 7, 1990

[54] MULTILAYER CAPACITOR DEVICE

[75] Inventors: Toshimi Kaneko; Hidetoshi Yamamoto; Hiromichi Sakai, all of Nagaokakyo, Japan

[73] Assignee: Murata Manufacturing Co., Ltd., Japan

[21] Appl. No.: 388,982

[22] Filed: Aug. 3, 1989

[30] Foreign Application Priority Data

Aug. 11, 1988 [JP] Japan .................... 63-106638[U]

[51] Int. Cl.$^5$ ............... H01G 4/34; H01G 3/06
[52] U.S. Cl. ........................ 361/321; 361/330
[58] Field of Search ............. 29/25.42; 361/328, 329, 361/330, 321

[56] References Cited

U.S. PATENT DOCUMENTS

| | | | |
|---|---|---|---|
| 2,665,376 | 1/1954 | Kodama | 361/329 X |
| 3,896,354 | 7/1975 | Coleman et al. | 361/330 X |
| 4,074,340 | 2/1978 | Leigh | 361/321 |

Primary Examiner—Donald A. Griffin
Attorney, Agent, or Firm—Ostrolenk, Faber, Gerb & Soffen

[57] ABSTRACT

Disclosed is a multilayer capacitor using a sintered body obtained by alternately laminating a plurality of ceramic green sheets each having first inner electrodes formed on its one major surface and a plurality of ceramic green sheets each having second inner electrodes extending in such a direction as to intersect the first inner electrodes formed on its one major surface and cofiring the same. The first inner electrodes are spaced apart from each other through a space region having a predetermined width in the same plane, and led out to first and second side surfaces of the sintered body. In addition, each of the second inner electrodes is let out to third and fourth side surfaces of the sintered body, and has a plurality of electrode portions for taking up capacitance overlapped with the first inner electrodes through a ceramic layer. A first outer electrode is formed on at least one of the first and second side surfaces of the sintered body, and at least one pair of second outer electrodes is formed on the third and fourth side surfaces of such body. Portions other than the electrode portions for taking up capacitance of each of the second inner electrodes are formed to have a width smaller than that of each of the electrode portions for taking up capacitance.

5 Claims, 6 Drawing Sheets

4,947,286

MULTILAYER CAPACITOR DEVICE

BACKGROUND OF THE INVENTION

1. Field of the Invention

The present invention relates generally &to a multilayer capacitor utilizing a sintered body obtained by laminating and cofiring a plurality of ceramic green sheets with electrode materials interposed therebetween and more particularly, to a multilayer capacitor suitable for the use as a noise filter or the like.

2. Description of the Background Art

Referring to FIGS. 1 to 3, description is made of an example of a multilayer capacitor heretofore used as a noise filter.

As shown in an exploded perspective view of FIG. 1, this multilayer capacitor is constructed by using a body obtained by laminating a and cofiring plurality of ceramic green sheets mainly composed of dielectric materials. More specifically, on a rectangular ceramic green sheet 1, an inner electrode 2 having a smaller Width than that of the ceramic green sheet 1 is formed so as to extend between both edges 1a and 1b. On the o&her hand, a plurality of second inner electrodes 4 to 7 are formed on the upper surface of a ceramic green sheet 3 so as to extend between longitudinal edges 3a and 3b. The above-described inner electrodes 2 and 4 to 7, which are formed by applying and printing conductive pastes on the ceramic green sheets 1 and 3, are completed by sintering the ceramic green sheets in a sintering process as described below.

A plurality of ceramic green sheets 1 and 3 are alternately laminated; an adequate number of ceramic green sheets 8 being free of an electrode on its upper surface are further laminated in the uppermost part (also in the lowest part, if necessary); and the ceramic green sheets 1, 3 and 8 are sintered after applying pressure in the direction of the thickness, thereby to obtain a sintered body.

As shown in FIG. 2 by imaginary lines outer electrodes 9, 10, 11a to 14a and 11b to 14b are formed on external side surfaces of the above described sintered body. More specifically, the pair of outer electrodes 9 and 10 is formed so as to be electrically connected to both ends of the above-described first inner electrode 2. In addition, the pair of outer electrodes 11a and 11b is formed so as to be electrically connected to both ends of the plurality of first inner electrodes 4. Similarly, the pairs of outer electrodes 12a and 12b to 14a and 14b are respectively formed so as to be electrically connected to both ends of the other inner laminated electrodes 5 to 7, respectively.

Accordingly, the following becomes apparent. In the above-described multilayer capacitor, a three-terminal type circuit shown in FIG. 3 is constituted between the pair of outer electrodes 11a and 11b and the outer electrode 9 or 10. Similarly, the circuit shown in FIG. 3 is respectively constituted between the other pairs of outer electrodes 12a and 12b, 13a and 13b and 14a and 14b and the outer electrode 9 or 10. More specifically, four noise filter units using the three terminal type circuit shown in FIG. 3 are constituted in this multilayer capacitor.

Meanwhile, in the above-described multilayer capacitor, filter characteristics can be improved by increasing capacitance between the first inner electrode 2 and each of the second inner electrodes 4 to ? in the noise filter units. Accordingly, the first inner electrode 2 is generally formed so as to have a relatively large width over almost the entire upper surface of the ceramic green sheet 1 (FIG. 1). Therefore, the upper surface of the ceramic green sheet 1 is only exposed in very narrow regions outside of side edges 2a and 2b of the first inner electrode 2. As a result, the ceramic green sheet 1 and the ceramic green sheet 3 laminated thereon are joined to each other only in regions with a small area there the upper surface of the ceramic green sheet I is exposed. Thus, the joining force between the ceramic green sheets 1 and 3 is weak. Consequently, delamination caused by the shrinkage or the like at the time of sintering is liable to occur, resulting in the possibility degrading filter characteristics.

Furthermore, when the width of the first inner electrode 2 ia made smaller, the area of the regions where the upper surface of the above-described ceramic green sheet is exposed can be increased, thereby hindering delamination. In such a case, however, relatively wide portions of the second inner electrodes 4 to 7 are forced out of the side edges 2a and 2b of the first inner electrode 2, resulting in the possibility of causing crosstalk due to stray capacitance between adjacent ones of the second inner electrodes 4 to 7.

Additionally, the above-described multilayer capacitor has the disadvantage in that realization cannot be made of good insertion loss characteristics, because the equivalent circuit shown in FIG. 3 is formed only of capacitor components.

SUMMARY OF THE INVENTION

An object of the present invention is to provide a multilayer capacitor capable of effectively preventing delamination and capable of achieving good crosstalk characteristics and insertion loss characteristics.

In accordance with a main aspect of the present invention, a multilayer capacitor is constructed using a sintered body obtained by laminating a plurality of ceramic green sheets made of dielectric materials having inner electrodes formed on its one major surface and cofiring the same. A plurality of first inner electrodes are formed in the same plane so as to extend between first and second side surfaces of the sintered body. The plurality of first inner electrodes are spaced apart from each other by a space region havIng a predetermIned width in the same plane. In addition, at least one second Inner electrode having a plurality of electrode portions for taking up capacitance is overlapped with the first inner electrodes through a ceramic layer. This second inner electrode extends in such a direction as to intersect the first inner electrodes, to be led out to third and fourth side surfaces of the sintered body At least one first outer electrode is formed on at least one of the firs& and second side surfaces of the sintered body. The first outer electrode is electrically connected to the first inner electrodes.

At least one pair of second outer electrodes is formed on the third and fourth side surfaces of the sintered body. The second outer electrodes are electrically connected to both ends of the above-described second inner electrode. Portions other than the above-described electrode portions for taking up capacitance of the second inner electrode are formed to have a smaller width than that of each of the electrode portions for taking up capacitance.

The above-described electrode portions for taking up capacitance are preferably formed to have a length within each of regions Where they are overlapped with the first inner electrodes through the ceramic layer.

In the present invention, space regions having a predetermined width are formed among the plurality of first inner electrodes in the same plane. Accordingly, in the space regions, the ceramic green sheets on upper and lower sides are directly joined to each other, so that the junction area is increased. As a result, delamination is prevented. In addition, the relatively narrow portions of the second inner electrode function as inductor components, resulting in an improvement in insertion loss characteristics The foregoing and other objects, features, aspects and advantages of the present invention will become more apparent from the following detailed description of the present invention When taken in conjunction with the accompanying drawings.

DESCRIPTION OF THE PREFERRED EMBODIMENTS

Figure 1:
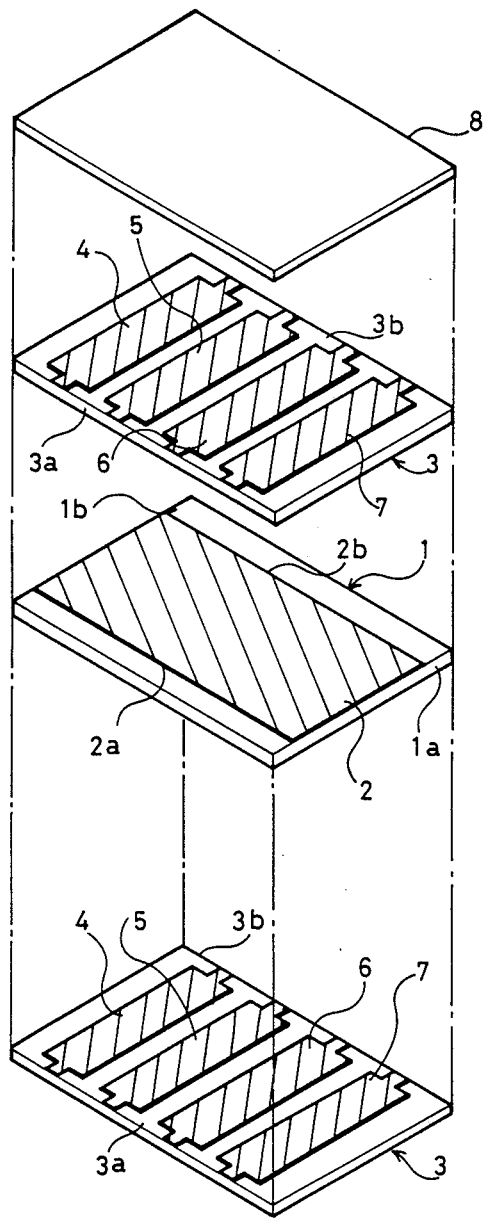
FIG. 1 is an exploded perspective view for explaining the shapes of a plurality of ceramic green sheets used for obtaining a conventional multilayer capacitor and inner electrodes formed on such sheets.
Figure 2:
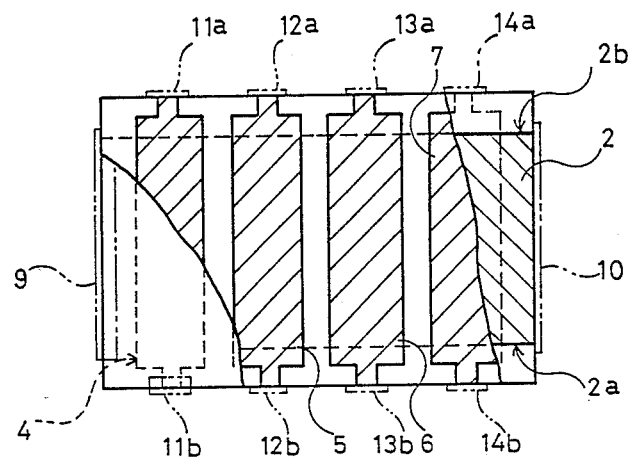
FIG. 2 is a partially broken plan view schematically showing a structure of electrodes in the conventional multilayer capacitor.
Figure 3:
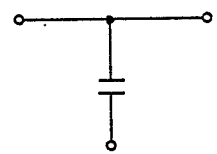
FIG. 3 is a diagram showing an equivalent circuit of a single noise filter unit in the conventional multilayer capacitor.
Figure 4:
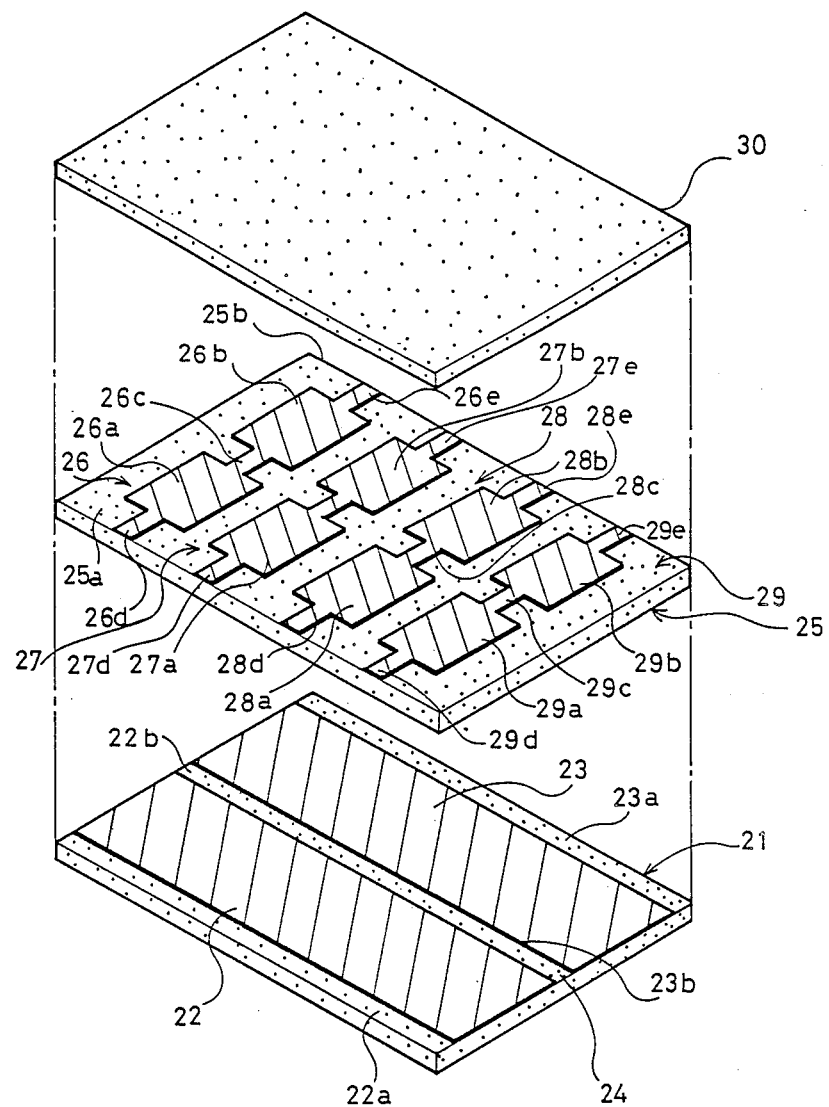
FIG. 4 is an exploded perspective view for explaining the shapes of a plurality of ceramic green sheets used for obtaining a multilayer capacitor according to an embodiment of the present invention and inner electrodes formed on such sheets.

FIG. 4 is an exploded perspective view for explaining the shapes of a plurality of ceramic green sheets used for obtaining a multilaYer capacitor according to an embodiment of the present invention and inner electrodes formed on such sheets. A plurality of first inner electrodes 22 and 23 are formed spaced apart from each other through a space region 24 having a predetermined width on the upper surface of a ceramic green sheet 21 made of dielectric materials. In addition, a plurality of second inner electrodes 26 to 29 are formed on the upper surface of a ceramic green sheet 25 made of dielectric materials so as to extend between both edges 25a and 25b along the longitudinal direction of the ceramic green sheet 25. The second inner electrodes 26 to 29 respectively have a plurality of relatively wide electrode portions for taking up capacitance 26a and 26b to 29a and 29b, relatively narrow connecting portions 26c to 29c for respectively connecting the electrode portions for taking up capacitance 26a to 29a and 26b to 29b, and relatively narrow portions for leading out capacitance 26d and 26e to 29d and 29e.

The relativelY wide electrode portions for taking up capacitance 26a to 29a and 26b to 29b are formed in positions there they are respectively overlapped with the first inner electrodes 22 and 25 through a ceramic layer when the ceramic green sheets 21 and 28 are laminated, to take up capacitance in the overlapped resins. On the other hand, the relatively narrow connecting portions 26c to 29c are formed in positions there they are overlapped with the space region 24 having a predetermined width in the lower ceramic green sheet 21 When the ceramic green sheets 21 and 25 are laminated.

The multilayer capacitor according to the present embodIment Is constructed by using a sintered body obtained by respectively preparing a plurality of ceramic green sheets 21 and 25 as described above to alternately laminate the same, laminating in the uppermost part (also in the lowest part, if necessary) an adequate number of ceramic green sheets 30 each being free of an electrode on its upper surface, and sintering the ceramic green sheets 21, 25 and 30 after applying pressure in the direction of lamination Meanwhile, the above-described first and second inner electrodes 22 and 23 and 26 to 29, which are formed by printing conductive pastes mainly composed of Ag or Ag-Pd in the shape as shown in FIG. 4 on the ceramic green sheets 21 and 25, are completed by sintering the conductive pastes along with dielectric ceramics in a sintering process.

Although in the present embodiment the four second inner electrodes 26 to 29 are arranged side by side in the direction in which the side edges 25a and 25b of the second ceramic green sheet 25 ex&end, an arbitrary number of second inner electrodes may be formed. For example, only a single second inner electrode may be formed.

Furthermore, although in the present embodiment two first inner electrodes 22 and 23 are formed, three or more first inner electrodes may be formed spaced apart from each other with a space region having a predetermined width. In this case, electrode portions for taking up capacitance the number of which corresponds to the number of the first inner electrodes are formed in each of the second inner electrodes 26 to 29.

In obtaInIng the above-described sintered body, the upper surface of the first ceramic green sheet 21 is exposed in not only regions outside of external side edges 22a and 23a of the first inner electrodes 22 and 23 but also the space region 24. Accordingly, the joining force between the ceramic green sheets 21 and 25 is strengthened, thereby allowing delamination to be effectively prevented.

Figure 5:
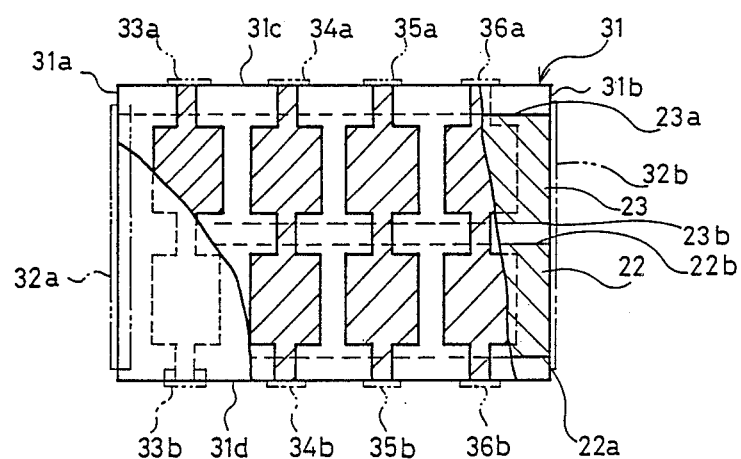
FIG. 5 is a partially broken plan view schematically showing the multilayer capacitor according to an embodiment of the present invention.
Figure 6:
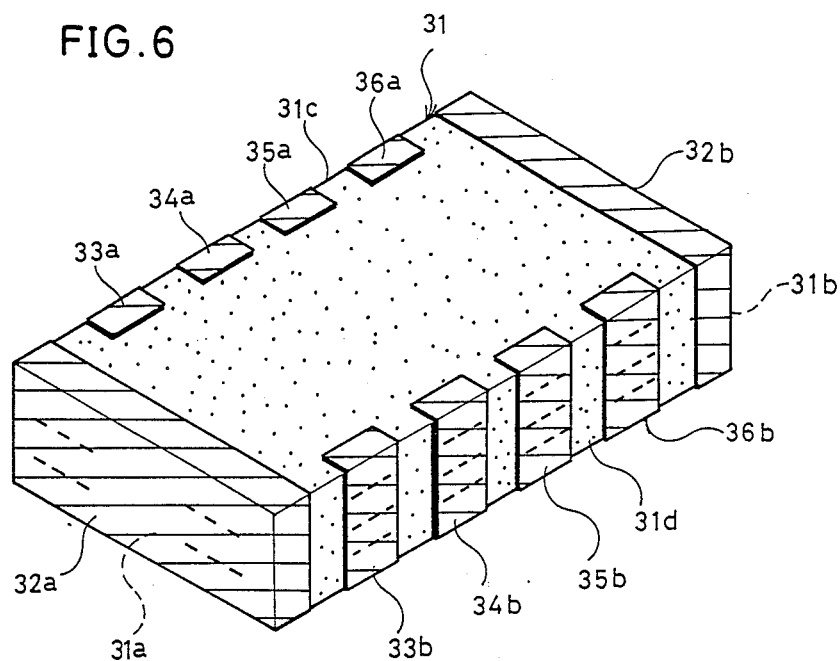
FIG. 6 is a perspective view showing the appearance of the multilayer capacitor according to an embodiment of the present invention.
Figure 9:
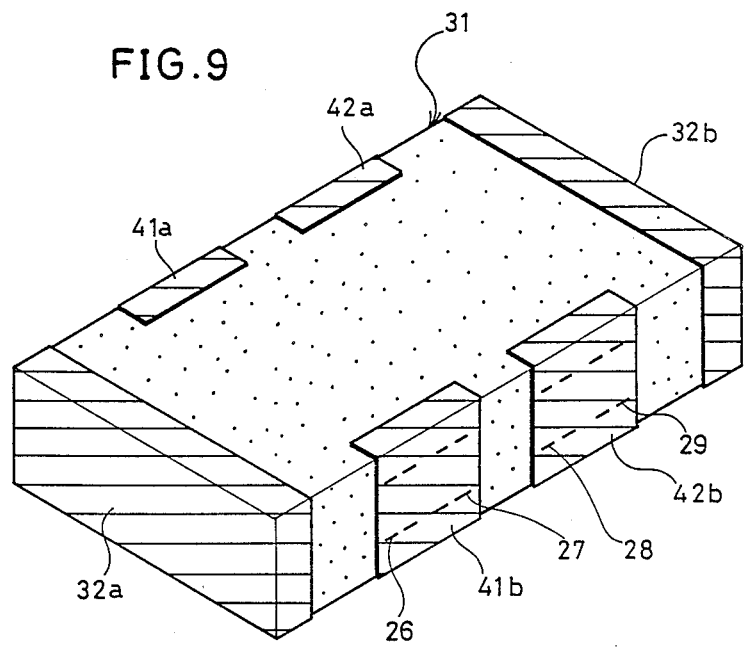
FIG. 9 is a perspective view showing the appearance of a multilayer capacitor according to another embodiment of the present invention.

The first inner electrodes 22 and 23 are exposed to first and second side surfaces 31a and 31b of an obtained sintered body 31, as shown in FIG. 5. In addition, the plurality of second inner electrodes 26 to 29 respectively laminated are exposed to third and fourth side surfaces 31c and 31d. Conductive pastes are applied and sintered on the first to fourth side surfaces 31a to 31d, thereby to form first outer electrodes 32a and 32b as well as second outer electrodes 33a and 33b to 36a and 36b, as shown in FIG. 6. The outer electrodes can be also formed by other suitable electrode forming methods such as application of conductive paste, evaporation, plating and sputtering.

Figure 7:
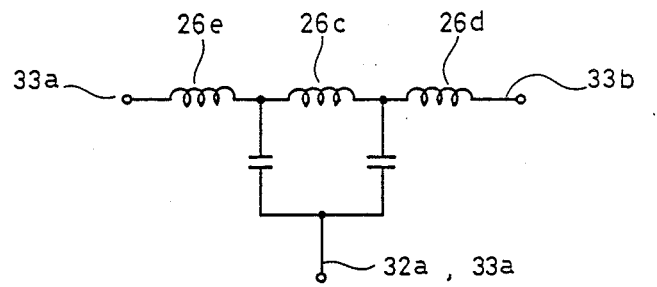
FIG. 7 is a diagram showing an equivalent circuit of a single noise filter unit in the multilayer capacitor according to an embodiment of the present invention.
Figure 8:
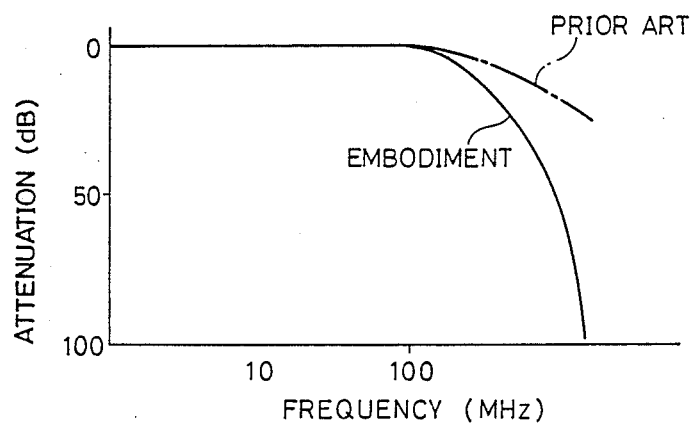
FIG. 8 is a diagram showing respective attenuation-frequency characteristics of the multilayer capacitor in an embodiment of the present invention and in a multilayer capacitor of the prior art.

Accordingly, the pair of outer electrodes 33a and 33b is electrically connected to both ends of laminated, the plurality of second inner electrodes 26. Thus, an equivalent circuit shown in FIG. 7 is constituted between the pair of second outer electrodes 33a and 33b and the first outer electrode 32a or 32b. Capacitor components are respectively taken up on the basis of portions there the electrode portions for taking up capacitance 26a and 26b of the second inner electrode 26 are respectively overlapped with the first inner electrodes 22 and 23. In addition, the portions for leading out capacitance 26d and 26e at both ends of the first inner electrode 26 as well as the relatively narrow connecting portion 26c function as inductor components. For example, therefore, insertion loss can be effectively reduced in a high frequency band according to the present embodiment, as compared with the prior art, as shown in FIG. 8. Characteristics represented by a dot-and-dash line in FIG. 8 indicate insertion loss in the prior art.

Although description was made of a noise filter unit constituted between the first inner electrodes 22 and 23 and the second inner electrode 26, similar noise filter units are respectively constituted between the other second inner electrodes 27 to 29 and the first inner electrodes 22 and 23. More specifically, in the multilayer capacitor according to the present embodiment, four noise filter units are respectively formed between the plurality of pairs of outer electrodes 33a and 33b to 36a and 36b and the outer electrode 32a or 32b.

Meanwhile, any one of the first outer electrodes 32a and 32b is used with it being connected to an earth electrode and, thus, it is necessary to form only at least one of the first outer electrodes. However, the symmetry of parts can be increased by respectively forming the outer electrodes 32a and 32b on the first and second side surfaces 31a and 31b, which is convenient.

Additionally, in the above-described embodiment, the length of each of the portions for leading out capacitance 26d and 26e to 29d and 29e of the second inner electrodes 26 to 29 is set to the length extending to a region inside of the external side edges 22a and 23a of the first inner electrodes 22 and 23, as obvious from FIG. 5. Similarly, the connecting portions 26c to 29c extend to regions outside of the internal side edges 22b and 23b of the first inner electrodes 22 and 23. In other words, the length of each of the plurality of electrode portions for taking up capacitance 26a and 26b to 29a and 29b of the second inner electrodes 26 to 29 is within in the width of each of the first inner electrodes 22 and 23. Accordingly, crosstalk due to stray capacitance between adjacent ones of second inner electrodes 26 to 29 is reduced.

In the above-described embodiment, the pairs of outer electrodes 33a and 33b to 36a and 36b are respectively formed with respect to the second inner electrodes 26 to 29. As shown in a perspective view of FIG. g, however, two pairs of outer electrodes 41a and 41b and 42a and 42b may be formed. More specifically, a plurality of inner electrodes 26 and 27 laterally adjacent to each other may be electrically connected between the outer electrodes 41a and 41b. Similarly, a plurality of second inner electrodes 28 and 29 may be electrically connected between the outer electrodes 42a and 42b. Thus, an arbitrary number of second outer electrodes may be formed on third and fourth side surfaces of a sintered body 31.

Figure 10:
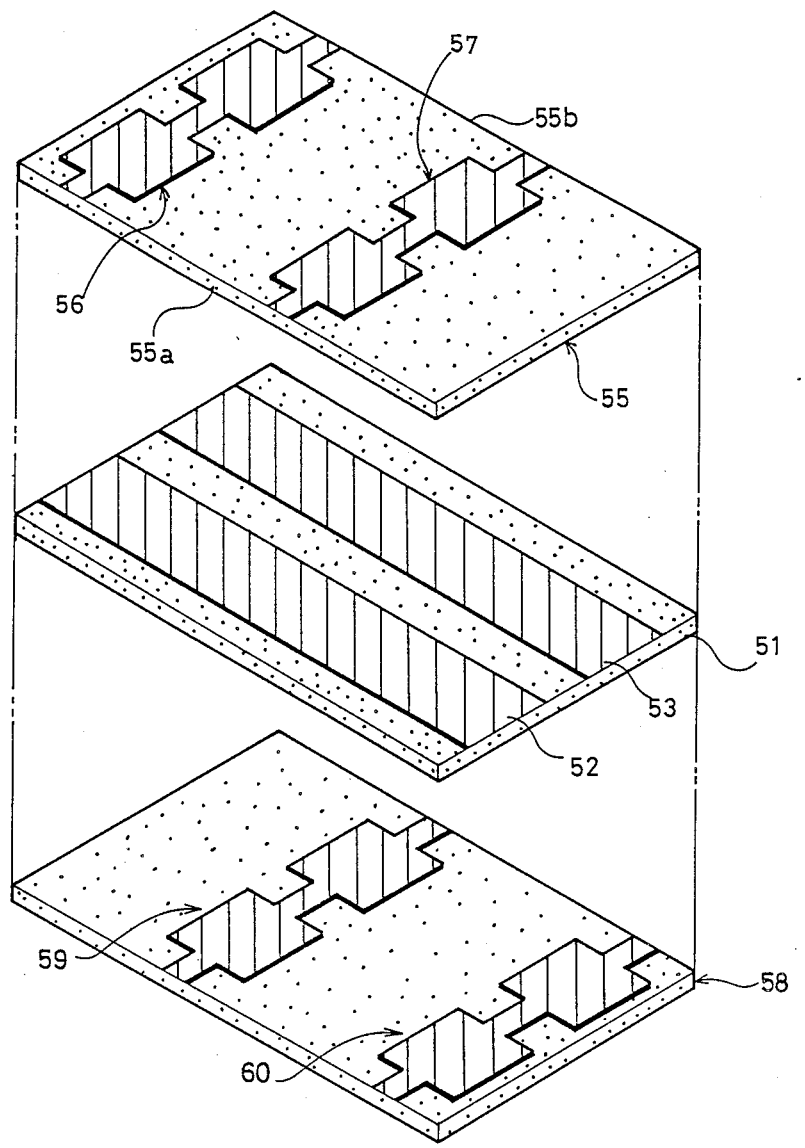
FIG. 10 is an exploded perspective view showing a multilayer capacitor according to still another embodiment of the present invention, for explaining the shapes of a plurality of ceramic green sheets used for obtaining such multilayer capacitor and inner electrodes formed on such sheets.

FIG. 10 is an exploded perspective view for explaining the shapes of a plurality of ceramic green sheets used for obtaining a multilayer capacitor according to still another embodiment of the present invention and inner electrodes formed on such sheets. In this embodiment, first inner electrodes 52 and 53 are formed spaced apart from each other with a space region having a predetermined width on a ceramic green sheet 51. The shape of each of the first inner electrodes 52 and 53 formed on this ceramic green sheet 51 is the same as that of each of the first inner electrodes 22 and 23 in the embodiment shoWn in FIG. 4. On the other hand, a plurality of second inner electrodes 56 and 57 extending between longitudinal edges 55a and 55b are formed on the upper surface of a ceramic green sheet 55 laminated on the upper side of the ceramic green sheet 51. Similarly, two second inner electrodes 59 and 60 are formed on the upper surface of a ceramic green sheet& 58 laminated on the lower side of the ceramic green sheet 51. The shape itself of each of the second inner electrodes 56, 57, 89 and 60 is the same as that of each of the second inner electrodes 26 and 29 in the embodiment& shoWn in FIG. 4.

The present embodiment is characterized by positional relations between the upper second inner electrodes 56 and 57 and the loWer second internal electrodes 59 and 60. More specifically, the second inner electrode 59 is arranged so as to be positioned in the center between the upper first inner electrodes 56 and 57 when the ceramic green sheets 51, 55 and 58 are laminated. Similarly, the upper second inner electrode 57 is arranged so as to be positioned in the center between the loWer second inner electrodes 59 and 60 when the ceramic green sheets are laminated. In the present embodiment, a multilayer capacitor is constructed by using a sintered body obtained by repeatedly laminating a plurality of ceramic green sheets 51, 55 and 58 with the ceramic green sheet 51 being interposed between the ceramic green sheets 55 and 58 and cofiring the same. AccordinglY, in the obtained sintered body, the second inner electrodes located on the opposite sides in the direction of thickness with the first inner electrodes 52 and 53 being interposed therebetween are formed in positions where they are not overlapped with each other. For example, the second inner electrodes 56 and 57 are arranged so as not to be overlapped with the second inner electrodes 59 and 60 in the direction of the thickness of the sintered body. Consequently, the distance between the second inner electrodes constituting noise filter units adjacent to each other in the lateral direction in the sintered body is increased thereby allowing crosstalk between the adjacent second inner electrodes to be effectively reduced.

Although the present invention has been described and illustrated in detail, it is clearly understood that the same is by way of illustration and example only and is not to be taken by way of limitation; the spirit and scope of the present inventIon being limited only by the terms of the appended claims.

What is claimed is:

1. A multilayer device of the type including a sintered body obtained by laminating and cofiring a plurality of ceramic green sheets made of dielectric material and having inner electrodes formed on major surfaces of the sheets, comprising:

a sintered body;

a plurality of first inner electrodes formed so as to extend between first and second side surfaces of said sintered body and respectively spaced apart from each other by a respective space region having a predetermined width on the same plane;

at least one second inner electrode having a plurality of electrode portions for taking up capacitance and being overlapped with one side of said first inner electrodes through a ceramic layer and extending in such a direction as to intersect said first inner electrodes and to be led out to third and fourth side surfaces of said sintered body;

a first outer electrode provided on at least one of the first and second side surfaces of said sintered body and electrically connected tot he first inner electrodes; and at least one pair of second outer electrodes formed on the third and fourth side surfaces of said sintered body and electrically connected to said second inner electrode;

portions other than the electrode portions for taking up capacitance of said second inner electrode being formed to have a smaller width than that of each of the electrode portions for taking up capacitance.

2. The multilayer capacitor device according to claim 1, wherein said electrode portions for taking up capacitance are formed to have a length within in each of regions where they are overlapped with the first inner electrodes through the ceramic layer.

3. The multilayer capacitor device according to claim 1, where a plurality of second inner electrodes are arranged side by side spaced apart from each other with predetermined spacing, and a plurality of pairs of second outer electrodes are formed on the third and fourth side surfaces of the sintered body.

4. The multilayer capacitor device according to claim 3, wherein a pair of second outer electrodes is formed with respect to each of the plurality of second inner electrodes.

5. The multilayer capacitor device according to claim 1, further comprising a further second inner electrode having a plurality of electrode portions for taking up capacitance and being overlapped with another side of said first inner electrodes through another ceramic layer and extending in such a direction as to intersect said first inner electrodes and to be led out to third and fourth side surfaces of said sintered body; the first mentioned and further second inner electrode being arranged so as not to be overlapped with each other.

* * * * *